No. 879,253.
PATENTED FEB. 18, 1908.
S. R. FRENCH.
MANURE SCRAPER AND LOADER.
APPLICATION FILED AUG. 28, 1907.
3 SHEETS—SHEET 1.
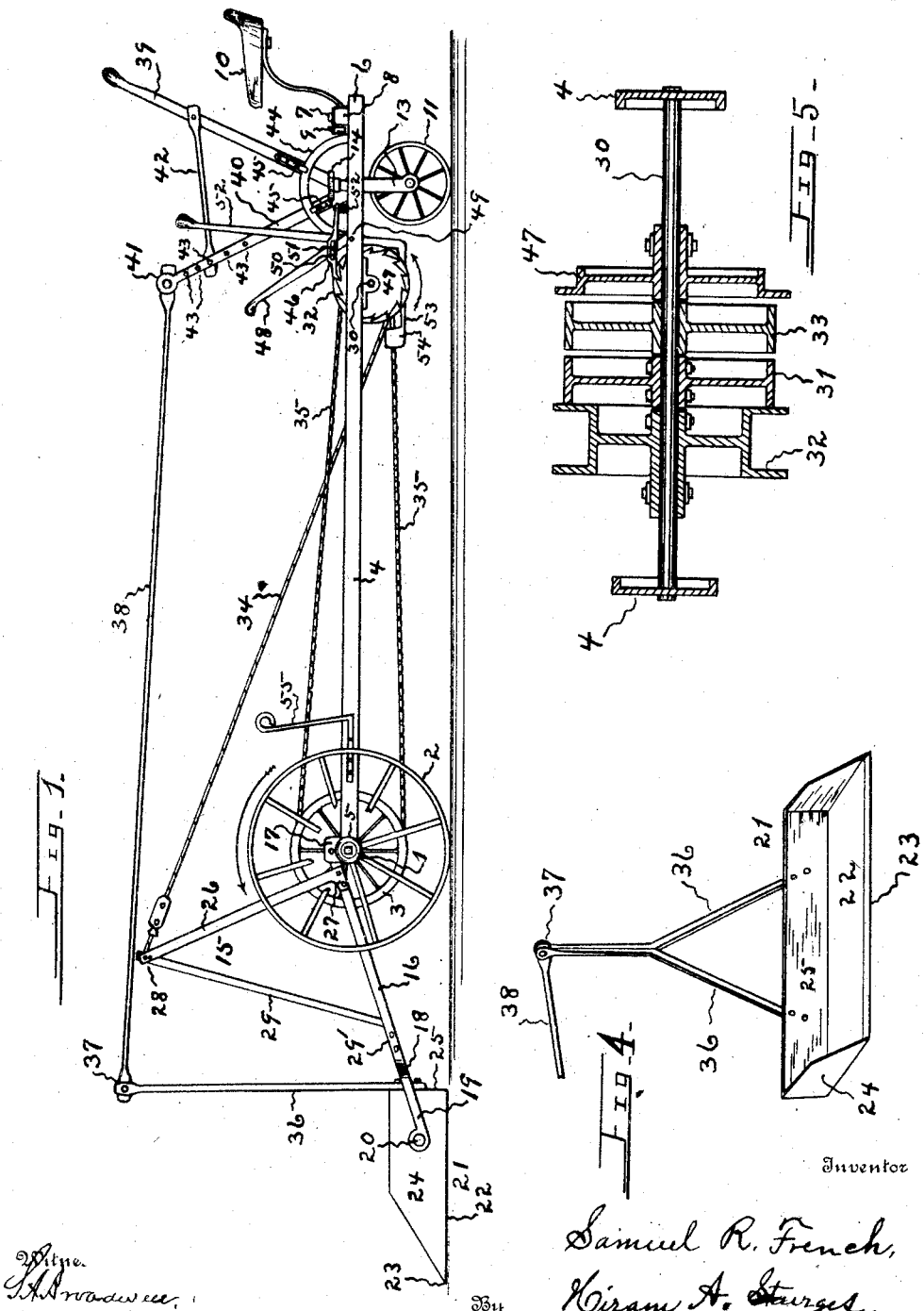

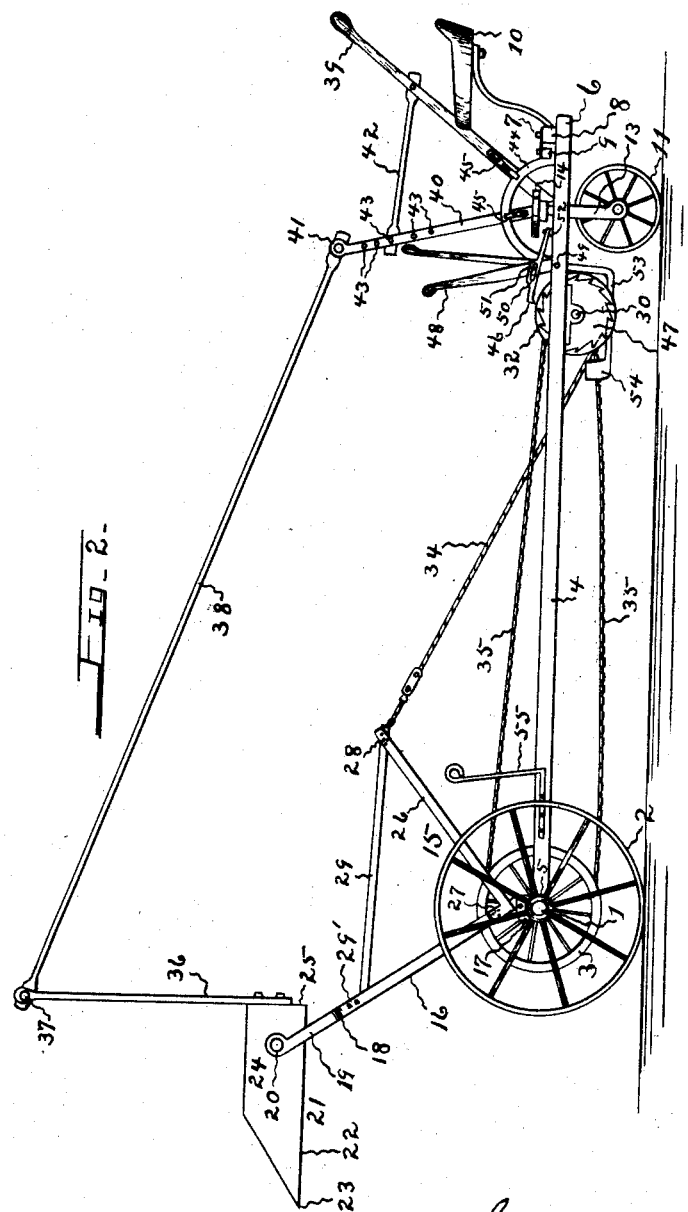

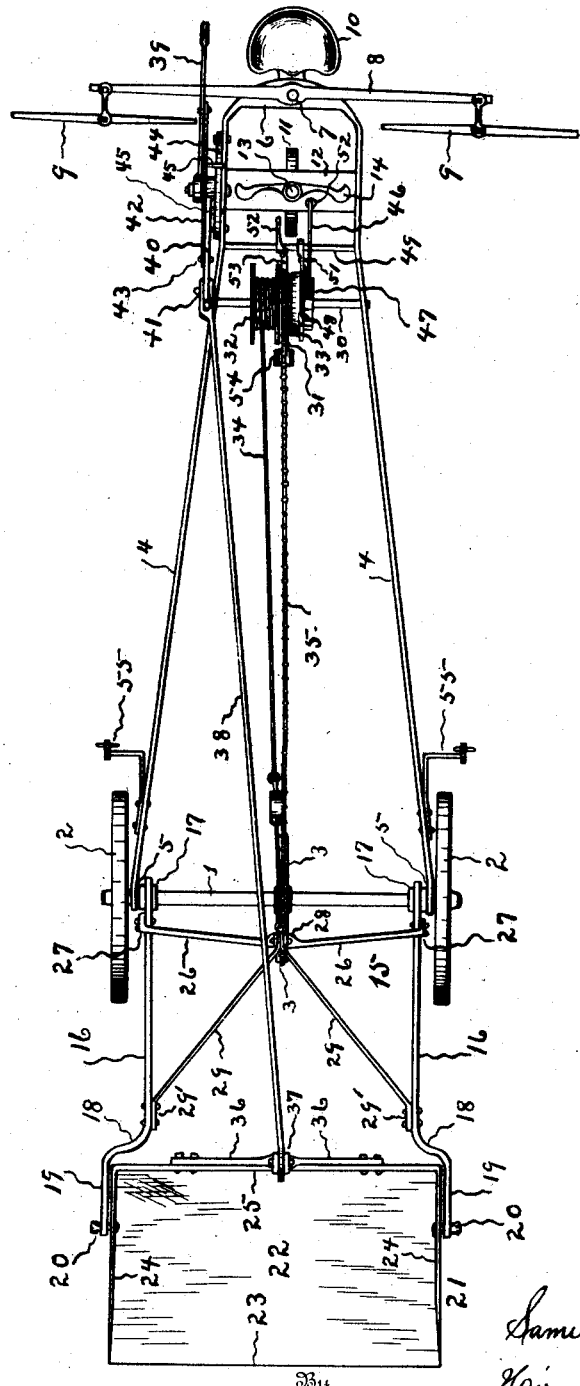

UNITED STATES PATENT OFFICE.

SAMUEL R. FRENCH, OF FARMINGTON, IOWA.

MANURE SCRAPER AND LOADER.

No. 879,253.

Specification of Letters Patent.

Patented Feb. 18, 1908.

Application filed August 28, 1907. Serial No. 390,443.

*To all whom it may concern:*

Be it known that SAMUEL R. FRENCH, a citizen of the United States, residing at Farmington, in the county of Van Buren and State of Iowa, has invented certain new and useful Improvements in Manure Scrapers and Loaders, of which the following is a specification.

This invention relates to improvements in manure scraper and loader and comprises a platform supported upon a team-driven running gear with a front angular frame mounted to oscillate from the axle for sustaining the scraper while it is being loaded and elevated.
The invention has reference to means for loading, raising and dumping the load, and for steering, all operations to be conducted by one person who drives the team and rides upon the machine; the employment of certain levers being depended upon for directing some of the movements.

When stock has been kept in feeding yards a large area of ground generally becomes covered with straw and manure, the gathering of which by ordinary methods requires considerable time and is attended with much labor and expense; the object of the present invention is to present a machine, whereby manure, straw or other refuse may be quickly scraped from the ground and elevated a sufficient height to be dumped upon a wagon or manure spreader; another object is to present a machine composed of few parts so that it may be inexpensive, comparatively speaking, in construction, but which will be effective for the purposes designed.

With these objects in view, the invention presents a novel combination and arrangement of parts, fully described herein, pointed out by the claims and illustrated in the drawings, wherein,—

Figure 1 represents a vertical, side view of the invention, showing the position of parts when the scraper is in a lowered position.
Fig. 2 is a somewhat similar view to that shown in Fig. 1, the scraper being elevated. Fig. 3 is a plan view of the invention, being a plan view of Fig. 1. Fig. 4 is a detail, being a perspective view, to show divergent arms 36 secured to the scraper-box or receptacle. Fig. 5 is a vertical, sectional view, showing the drum, sprocket-wheel, idler wheel and ratchet-wheel mounted upon shaft 30.

Referring now to the drawings for a more particular description, the numeral 1 indicates a rotatable axle, and 2 a pair of wheels rigidly secured thereon; and rigidly upon the axle, midway between the wheels, is mounted a sprocket wheel 3.

As a platform for sustaining the parts in operative position, I employ the side-pieces 4, their front ends being pivotally mounted at 5 upon and near the ends of the axle, and, preferably, side-pieces 4 are extended convergingly from their front ends toward the rear, and are connected at their rear ends by the cross-beam 6.

Upon cross-beam 6 I mount, at 7, the double tree 8 to which whiffletree 9 may be attached. The driver's seat is indicated at 10, and I employ the caster-wheel 11 disposed midway between and near the rear end of side-pieces 4, and having suitable bearings upon any convenient support, as upon plate 12 secured transversely between sides 4; the swivel-post 13 of the caster-wheel extends vertically to traverse platform 12, and upon the upper end of post 13 is rigidly mounted the oppositely-disposed pedal-arms 14; by this construction it is intended that the operator or driver who occupies the seat may engage pedal-arms 14, one with each foot, and when the machine is being driven forwardly, will guide or steer its course by pushing forward one or the other of arms 14, as desired.

I construct an A-shaped or angular frame 15, consisting in part of sustaining-arms 16, for holding the scraper; the inner ends of arms 16 are pivotally mounted upon axle 1, as within trunnions 17 closely adjacent to and between wheels 2; arms 16 extend parallel with each other and near their outer ends are provided preferably, with outwardly curved extensions 18 which have terminal holding-arms 19 formed substantially parallel with arm 16; and between terminal arms 19 is pivotally mounted, as at 20, the scraper 21; scraper 21 is provided with a flat bottom 22 having a horizontally-disposed front cutting-edge 23, upset sides and back, shown respectively at 24 and 25. The other arms comprising the A-shaped frame 15 are indicated at 26; the inner ends of arms 26 are rigidly secured upon the inner ends of arms 16, as at 27 and near the axle, from which they pass convergingly, their outer ends being secured together as at 28; brace-rods 29 may be employed having one of their ends rigidly secured near the outer ends of arms

16, as at 29', their opposite ends being secured to the outer terminals of arms 26. As thus described, arms 16 and 26 are sustained in a fixed relative position with reference to each other as an angularly formed frame 15, and this frame may have a swinging movement while supported upon the axle, the radii of arms 16 and 26 being greater than that described by the wheels; and the swinging movement of said frame is under control of devices presently to be described.

Scraper 21 may be filled while the parts are in the position shown in Fig. 1. At this time the scraper rests upon the ground, and as the machine is moved forward, the sharp blade of the scraper passes beneath the manure or refuse; a forward movement of the machine is continued until the scraper-box is filled, after which the scraper-box is elevated to the position shown in Fig. 2 and is then dumped, in the manner presently to be explained.

Shaft 30 is mounted between sides 4 near the rear of the machine, and upon this shaft is rigidly mounted the sprocket-wheel 31, and I employ the drum 32 also rigidly mounted upon shaft 30, and the drum will rotate in unison with wheel 31 as is obvious; adjacent wheel 31 and pivotally mounted upon shaft 30, is the idler wheel 33, preferably having a diameter similar to that of wheel 31.

Any flexible member, as cable 34 is employed, and has one end connected with the outer ends of arms 26, its opposite end being wound upon drum 32; sprocket-chain 35 connects wheel 3 with wheel 31, and since a forward movement of the machine causes wheels 2 to rotate in the direction indicated by the large arrow in Fig. 1, the drum will rotate in a corresponding direction. Since a part of the cable, by this movement, will be wound upon the drum, said cable will be drawn rearward which will cause a rearward swinging movement of frame 15, and this will elevate the scraper, as is obvious.

Since the scraper box is pivotally mounted at 20, it may be controlled in its movements, as will be seen. Arms 36 have their upper ends pivotally mounted, as at 37, upon the front end of dumping-link 38; and arms 36 are extended divergently downward, their lower ends being rigidly secured upon the upset back 25 of the scraper; and I employ any convenient means so that the driver or operator may control a longitudinal movement of link 38, as lever 39 and its connections. Lever 40 has its upper end pivotally connected, as at 41, with the rear end of link 38; the lower ends of levers 39 and 40 have pivotal mountings upon one of the side-pieces 4, and these levers are connected adjustably between their ends by means of link 42, since the latter has an adjustable mounting with lever 40 at any one of apertures 43, formed in lever 40. I provide the curved guide 44 secured to side-piece 4 adjacent to the pivotal mountings of levers 39 and 40 before named, and I provide keepers 45 upon each of levers 39 and 40, so that these levers may be suitably sustained while in operation.

After the scraper-box or receptacle has been filled and elevated it is sustained in an elevated position by means of pawl 46 which engages ratchet-wheel 47; pawl 46 may be lowered or raised to engagement or disengagement with ratchet-wheel 47 by means of lever 48; the lower end of lever 48 is pivotally mounted upon rod 49, the latter extending transversely and supported between side-pieces 4. Pawl 46 may be provided with the longitudinal slot 50 within which may be seated pin 51 of lever 48, and the rear end of the pawl is resiliently mounted, as at 52; by the construction described the drum may be released whenever desired, so that cable 34 may be unwound from said drum. When the scraper-receptacle is elevated to the position shown in Fig. 2, if lever 39 is moved in a direction toward the front of the machine, the front part of the scraper will be pointed downward so that the contents of said receptacle will slide therefrom; and this is the operation of dumping or unloading. At this time and during the operation of unloading, pawl 46 engages the ratchet-wheel.

The inclination of the scraper-receptacle is under control of lever 39, to some extent, at the time of loading; and at the time the several parts are in the position shown in Fig. 1, the bottom of the scraper being upon the ground, a slight forward movement of lever 39 will cause the scraper-blade to be depressed so that it will more closely engage the ground and more effectually gather the refuse.

At the time of manipulating levers 39 and 40, they are adequately sustained by guide 44 so that undue strain or vibration will be avoided. The scraper-receptacle at the time of dumping is in an elevated position and after it has been dumped, the operation of lowering frame 15 is performed, and this will now more fully be explained. The driver or operator moves lever 39 forward, and by use of lever 48 releases pawl 46; the parts at this moment are as shown in Fig. 3, and a forward movement of lever 39 allows frame 15 to swing forward until the scraper rests upon the ground. The machine is then moved forward until the scraper-box is filled. While the machine is being thus moved forward to gather the manure, sprocket-chain 35, of course, is made to engage idler-wheel 33 during that operation.

I employ lever 52 having a pivotal mounting between its ends upon rod 49, and having a sidewise swinging movement. The lower end of lever 52 passes below side-pieces 4, and is provided with an extension 53 passing forwardly so that the shoe 54 thereon may make contact with chain 35; and by moving lever 52 in a sidewise direction, the sprocket chain may be readily controlled and an engagement thereof made with idler wheel 33 or with sprocket wheel 31, as desired.

As soon as the scraper-box has been loaded in the manner described, and while the machine is moving forward, lever 52 is moved sidewise which causes chain 35 to engage wheel 31 and thereby cable 34 will be wound upon the drum, as already explained, to elevate the scraper-box; and when the scraper-box has been elevated it is held in an elevated position by pawl 46, until dumped. As soon as the load has been elevated, chain 35 by use of lever 52, is transferred to the idler wheel, and the machine may then be moved to any place desired, for the purpose of dumping. The machine is guided by means of caster-wheel 11, which needs no particular description further than already made; pedal-arms 14 are rigidly secured to post 13, and a swinging movement of the pedal-arms while moving forward, will cause the rear end of the machine to have a corresponding sidewise movement.

The machine may be used for scraping the ground and gathering manure or any refuse material very effectively and with a great saving of labor. The scraper may be constructed of any desired length or width proportionate to the strength of other parts, and the entire machine or any part of it may be constructed of metal, if desired.

Numerals 55 indicate hitching-rods, and these may be secured in any convenient manner, as upon side-pieces 4, near wheels 2.

From the description thus given, the construction and operation of the machine will be understood. While I have explained many details of construction I do not wish to be understood as limiting myself thereby. It is considered that many of these details may be omitted or changed without departing from the scope of the invention, since the latter is determined by the claims.

What I claim as my invention, is,—

1. A machine as described, in combination, comprising an axle provided with a first gear wheel and formed with supporting wheels thereon; a supporting guide-wheel, an idler-wheel, a ratchet-wheel and a resiliently-mounted pawl adapted to make operative contact with said ratchet-wheel; side-pieces extending rearwardly from said axle to said supporting guide-wheel and having an operating-shaft mounted transversely therebetween; a tilting-lever mounted upon one of said side-pieces and provided with a sustaining-guide; a scraper-box having a flat bottom with a front cutting-edge and having a controlling-arm extending upwardly from its rear end; a link having end-connections upon said controlling-arm and upon said tilting-lever; sustaining-arms extending forwardly from said axle and provided with a transversely-disposed brace and having pivotal mountings at their rear terminals upon said axle, their front ends having pivotal mountings upon the sides of said scraper-box; said winding-drum, second gear-wheel and ratchet-wheel mounted rigidly upon said operating-shaft; said idler-wheel mounted upon said operating shaft; a cable having one of its ends connected with the transversely-disposed brace of said sustaining arms, its opposite end connected with said winding-drum; a flexible member connecting said first gear-wheel and second gear-wheel; and means to transfer said flexible member from the second gear-wheel to said idler-wheel.

2. In combination, a machine as described, consisting of supporting mechanism comprising an axle with forwardly-movable bearing-wheels, a rear guide-wheel, side-pieces connecting the axle and said rear guide-wheel; a scoop-receptacle formed with a front cutting edge and having an upwardly-extending controlling-bar; an operating-frame comprising sustaining-arms pivotally mounted upon said axle between said forwardly-movable bearing-wheels and extended forwardly to a pivotal mounting upon said scoop-receptacle, said sustaining-arms having transversely and convergingly disposed brace members secured between its terminals; hoisting mechanism comprising a sprocket upon the axle, an operating-shaft transversely supported between said side-pieces and having thereon a sprocket, a winding-drum, an idler-wheel, and a ratchet with a pawl connection; means for lowering said scoop-receptacle comprising a hand-lever having a link connection with said controlling-bar of the scoop-receptacle; a flexible member extended between the sprocket of said axle and the sprocket upon said operating-shaft, and a flexible member extended between the brace-members of the sustaining-arms and said winding-drum.

3. In combination, a machine as described, consisting of supporting mechanism comprising an axle with forwardly-movable bearing-wheels, a rear guide-wheel, a connecting frame between the axle and said rear guide-wheel; a scraper-receptacle provided with an upwardly extending controlling-bar; an operating frame comprising sustaining-arms pivotally mounted upon said axle and extended forwardly to a pivotal mounting upon said scraper receptacle, said sustaining-arms having transversely disposed brace members secured thereon; hoisting mechanism, comprising a sprocket upon the axle, an operating shaft transversely disposed and supported upon said connecting frame and having thereon a sprocket, a winding-drum, an idler-wheel, and a ratchet, a pawl connection; means for lowering said scraper-receptacle, comprising a hand-lever having a link connection with said controlling-bar of the scraper-receptacle; a first flexible member extended between the brace-members of the sustaining-arms and said winding-drum; a second flexible member extended between the sprocket of said axle and the sprocket upon said operating-shaft; means to control the movements of said pawl, and means to control a sidewise shifting movement of said second flexible member.

In testimony whereof he has affixed his signature in presence of two witnesses.

SAMUEL R. FRENCH.

Witnesses:
LOUIS NEUNN,
JOHN T. CROSS.